United States Patent [19]

Lindemann et al.

[11] 4,093,317
[45] June 6, 1978

[54] VEHICLE ANTISKID BRAKE CONTROL SYSTEM HAVING MEANS FOR ADJUSTING A NON-SENSED WHEEL BRAKE PRESSURE RELATIVE TO A SENSED WHEEL BRAKE PRESSURE

[75] Inventors: Klaus Lindemann, Hanover; Lutz Weise, Misburg; Erich Reinecke, Beinhorn, all of Germany

[73] Assignee: WABCO Westinghouse GmbH, Hanover, Germany

[21] Appl. No.: 801,435

[22] Filed: May 27, 1977

[30] Foreign Application Priority Data

Jun. 18, 1976 Germany .............................. 2627284

[51] Int. Cl.² ............................................. B60T 13/68
[52] U.S. Cl. ..................................... 303/111; 303/113
[58] Field of Search ..................... 188/181; 244/111; 303/7, 20, 91–119

[56] References Cited

U.S. PATENT DOCUMENTS

| | | | |
|---|---|---|---|
| 3,467,444 | 9/1969 | Leiber | 303/105 |
| 3,819,236 | 6/1974 | Fink et al. | 303/119 |
| 3,843,207 | 10/1974 | Syria | 303/97 |
| 3,926,477 | 12/1975 | Klatt | 303/111 |
| 3,980,346 | 9/1976 | Leiber | 303/115 X |

*Primary Examiner*—Stephen G. Kunin
*Attorney, Agent, or Firm*—R. W. McIntire, Jr.

[57] ABSTRACT

An antiskid brake control system in which an electronic evaluation circuit subject to dynamic behavior signals produced by a wheel sensor associated with one wheel of an axle controls modulator valve device in the brake cylinder fluid pressure conduit to adjust the brake cylinder pressure at the sensed wheel as well as at the non-sensed wheel of the axle independently of an operator controlled brake valve device. There is provided in alternate arrangements of the invention an electrical delay element via which either the supply or exhaust valve comprising the modulator valve device associated with the non-sensed wheel is controlled so that the non-sensed wheel brake pressure development is inhibited relative to the sensed wheel brake pressure to provide better stability of the non-sensed wheel. Another arrangement provides an electrical delay element via which the exhaust valve comprising the modulator valve device of the sensed wheel is controlled so as to inhibit the exhaust of brake pressure therefrom while the non-sensed wheel brake pressure is reduced in the usual manner under control of the evaluation device when a wheel skid condition of the sensed wheel is detected. As an alternative to the electrical delay elements in these arrangements, there may be provided a fluid pressure flow restrictor in the appropriate brake cylinder conduit, with the direction of restricted flow being controlled by a one-way check valve.

19 Claims, 6 Drawing Figures

VEHICLE ANTISKID BRAKE CONTROL SYSTEM HAVING MEANS FOR ADJUSTING A NON-SENSED WHEEL BRAKE PRESSURE RELATIVE TO A SENSED WHEEL BRAKE PRESSURE

BACKGROUND OF THE INVENTION

The present invention relates to an antiskid control system for the fluid pressure brakes of a wheeled vehicle, particularly a road vehicle, wherein one wheel of at least one axle is provided with a sensor for detecting the dynamic wheel behavior during braking so as to reduce, hold constant or increase the wheel brake pressure in accordance with operation of a modulator valve assembly consisting of solenoid operated supply and exhaust valves controlled by an electric evaluation circuit that is subject to output signals from the wheel sensor.

Wheel antiskid control systems of the above type are theoretically comparable in effectiveness to systems in which each wheel is provided with a separate control channel and have the advantage of being considerably less expensive in that only half as many components are required.

In actual practice, however, the effective brake forces on the sensed and non-sensed wheels may differ due to variables in the brake shoe linings and force transmitting devices in spite of the application of uniform brake pressure to the respective wheels, thus giving rise to instability of the non-sensed wheel and possible locking thereof when the sensed wheel is free of skidding such that the skidding condition of the non-sensed wheel is undetected.

SUMMARY OF THE INVENTION

The object of the present invention, therefore, is to provide for an antiskid control system, in which only a single wheel of a given axle is sensed, means for preventing the non-sensed wheel from locking-up during a wheel skid control cycle that is instigated in accordance with the dynamic behavior of the sensed wheel.

According to the present invention, this objective is fulfilled by providing delay means for establishing a brake pressure differential between the sensed and non-sensed wheels such as to assure that the non-sensed wheel does not skid during braking. In one aspect of the invention wherein each wheel brake cylinder has a modulator valve associated therewith, the delay means comprises an electrical device, such as a timer or the like, via which either the supply or exhaust valve of the non-sensed wheel modulator is controlled, or via which the exhaust valve of the sensed wheel modulator is controlled.

In another aspect of the invention, wherein the sensed and non-sensed wheel brake cylinders are pressurized via a single modulator valve, the delay means comprises a fluid pressure restriction via which either the non-sensed wheel brake pressure is supplied or the sensed wheel brake pressure is exhausted.

In still another aspect of the invention, the delay means for the respective front and rear axle assemblies comprise an electrical device, which may be activated in response to a brake pressure differential between the sensed wheels of each axle exceeding a predetermined limit.

BRIEF DESCRIPTION OF THE DRAWINGS

In the drawings to which the following more detailed description refers.

DESCRIPTION AND OPERATION

Figure 1:
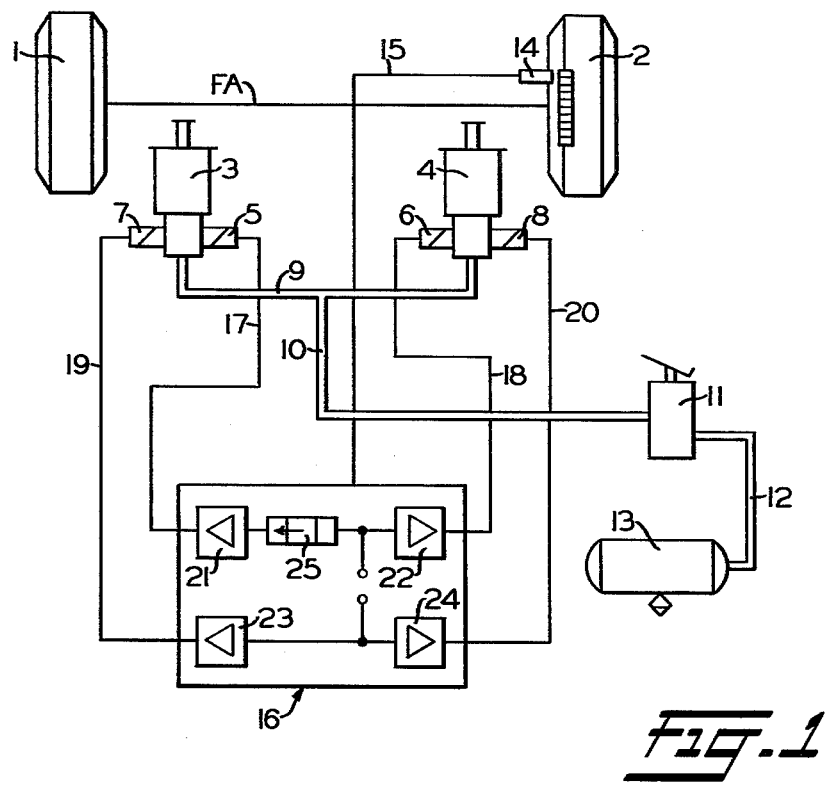
FIG. 1 shows a schematic diagram for a vehicle antiskid brake control system in which a brake pressure modulator valve is controlled by an electronic evaluation circuit to delay the reapplication of fluid brake pressure to the non-sensed wheel of an axle during a wheel skid control cycle instigated in accordance with the dynamic behavior of a sensed wheel of the axle.

Although intended for a vehicle having at least two axles, the system in FIG. 1 illustrates an antiskid control circuit for only a single axle, since the other axle would be similarly arranged, except that the left wheel would be provided with a sensor instead of the right wheel of front axle FA. The advantage of sensing diagonally disposed wheels is known to be that different adhesion values between the left and right wheels of a given axle can be taken into account in the control thereof.

Front axle FA includes wheels 1, 2 and a brake cylinder 3, 4 (each associated with a respective wheel) to which a modulator valve assembly is attached. The respective modulator valve assemblies comprise a solenoid operated supply valve 5, 6 and a solenoid operated exhaust valve 7, 8. Supply valves 5, 6 are normally open (deenergized) and closed when energized, while exhaust valves 7, 8 are normally closed (deenergized) and opened when energized. A pipe 9 interconnects brake cylinders 3, 4 with a pipe 10 in which fluid pressure is controlled by a foot operated brake valve device 11. A pipe 10 connects fluid pressure to brake valve device 11 from a storage tank 13. Right wheel 2 of front axle FA is provided with a wheel sensor 14 whose output signals are connected via line 15 to an electronic evaluation circuit 16 that processes the sensor signals to detect the dynamic behavior of wheel 2. From circuit 16, there are connected control lines 17, 18 to supply valves 5, 6 and control lines 19, 20 to exhaust valves 7, 8. Evaluation circuit 16 includes amplifiers 21, 22, 23 and 24 via which the respective control lines 17, 18, 19 and 20 may be energized. Interposed in control line 17 is an electrical delay element 25, which delays energization of the solenoid operated supply valve 5 of the non-sensed wheel 1. Delay element 25 may be a conventional timer or relay exhibiting a "delay on drop out" characteristic.

In making a brake application, the vehicle operator actuates brake valve device 11 to connect pressure from reservoir 13 to brake cylinders 3, 4 via lines 10 and 9. As each wheel brake pressure develops, the wheels are decelerated. Sensor 14 associated with the right wheel 2 of front axle FA transmits wheel behavior signals to evaluation circuit 16 via line 15. If in processing these signals, evaluation circuit 16 detects a tendency of wheel 2 to lock and thus skid, a control signal is supplied to lines 17, 18 to energize solenoid valves 5, 6, which immediately terminate the supply of fluid pressure to brake cylinders 3, 4. Evaluation circuit 16 further produces control signals on lines 19, 20 to energize solenoid valves 7, 8, thereby exhausting the pressure in brake cylinders 3, 4 to relieve braking force on the wheels sufficiently to allow the respective wheels to accelerate toward synchronous rotation. As the wheel accelderates into a more favorable slip range indicative of recovery from the impending skid condition, evaluation circuit 16 terminates its control signals to restore the brake cylinder modulator valves to their normal condition, in which fluid pressure under control of the operator is reestablished. However, delay element 25 maintains the control signal at line 17 to prevent supply valve 5 from reopening for a predetermined period of time. This predetermined time period, delaying opening of supply valve 5, thus reduces the time that fluid pressure is able to build up in brake cylinder 3 before a subsequent cycle of wheel skid control occurs. In limiting the reapplication of brake pressure at brake cylinder 3, wheel 1, which is without a sensor is prevented from skidding prior to wheel 2, even when running on a surface offering a lower adhesion value.

Figure 2:
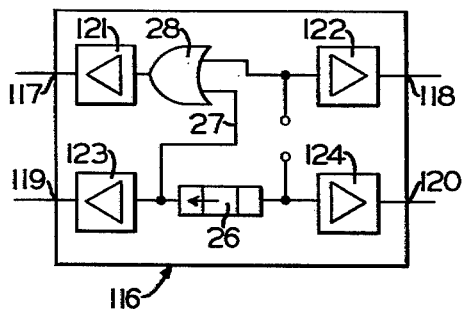
FIG. 2 shows an alternate arrangement of a circuit schematic of the evaluation circuit of FIG. 1 for controlling the non-sensed wheel modulator valve so as to delay termination of the non-sensed wheel brake pressure exhaust.

The same result can be obtained by prolonging the time of actuation of solenoid operated exhaust valve 7 of the non-sensed wheel 1, as shown by the circuit of FIG. 2. For the sake of simplicity, only the electronic evaluation circuit and control lines are shown, since in all other respects the control system is the same as in FIG. 1. The items of FIG. 2 corresponding to parts in FIG. 1 are identified by a like reference numeral increased by the value of 100.

From evaluation circuit 116 of FIG. 2, there are control lines 117, 118 leading to the supply valves of the modulator valve assemblies at the wheel brake cylinders of the front axle. Also connected from circuit 116 are control lines 119, 120 leading to the exhaust valves of the respective modulator valve assemblies. Interposed in the respective control lines 117, 118, 119 and 120 are amplifiers 121, 122, 123 and 124 via which the evaluation circuit controls the supply and exhaust valves of the modulator valve assemblies. An electrical delay element 26 is provided in control line 119 to maintain energization of exhaust valve 107 of the non-sensed left wheel modulator valve assembly for an extended duration as compared to the duration the exhaust valve 108 of the sensed wheel modulator valve is energized. An OR gate 28 is connected in control line 117 with an input connected via line 27 to line 119 at a point between delay element 26 and amplifier 123, in order to also maintain supply valve 105 energized so long as exhaust valve 107 of the same non-sensed modulator valve assembly is energized. This keeps the supply valve 105 closed as long as exhaust valve 107 is open to prevent loss of fluid pressure from brake cylinder 4 via pipe 9. Consequently, the arrangement of FIG. 2 establishes a lesser brake pressure in brake cylinder 3 than in brake cylinder 4 to prevent a skid condition from developing at the non-sensed wheel 1 during a cycle of wheel skid control, as influenced according to the behavior of the sensed wheel 2.

Figure 3:
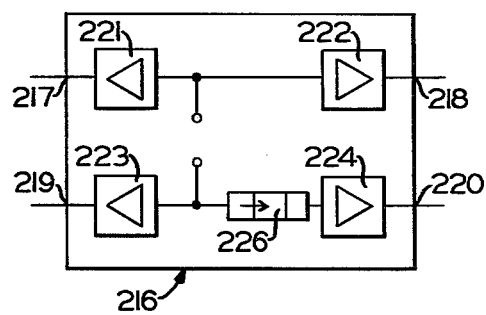
FIG. 3 shows an alternate arrangement of a circuit schematic of the evaluation circuit of FIG. 1 for controlling the modulator valve of the sensed wheel in order to delay the exhaust of brake pressure therefrom.

It is also possible, as illustrated in FIG. 3, to prevent the non-sensed wheel from becoming unstable by providing a delay element in the control line leading to the solenoid exhaust valve of the sensed wheel. Components in FIG. 3 which are identical with those of FIG. 2 are identified by the same reference numerals, but increased by a value of 200.

From evaluation circuit 216 of FIG. 3, there are control lines 217, 218 leading to the supply valves of the respective wheel modulator valve assemblies of the front axle. Also connected from circuit 216 are control lines 219, 220 leading to the exhaust valves of the respective wheel modulator valve assemblies. A delay element 226 is provided in control line 220 to delay energization of the sensed wheel exhaust valve for a predetermined duration following energization of the non-sensed wheel exhaust valve. This results in the non-sensed wheel brake pressure being reduced for a longer duration than the sensed wheel brake pressure, thus preserving wheel stability of the non-sensed wheel, since the greater reduction of brake pressure thereat will prevent a subsequent reapplication of pressure during a wheel skid control cycle from developing to a level comparable to the sensed wheel brake pressure, which is reapplied from a higher level and therefore exceeds the non-sensed wheel brake pressure.

Figure 4:
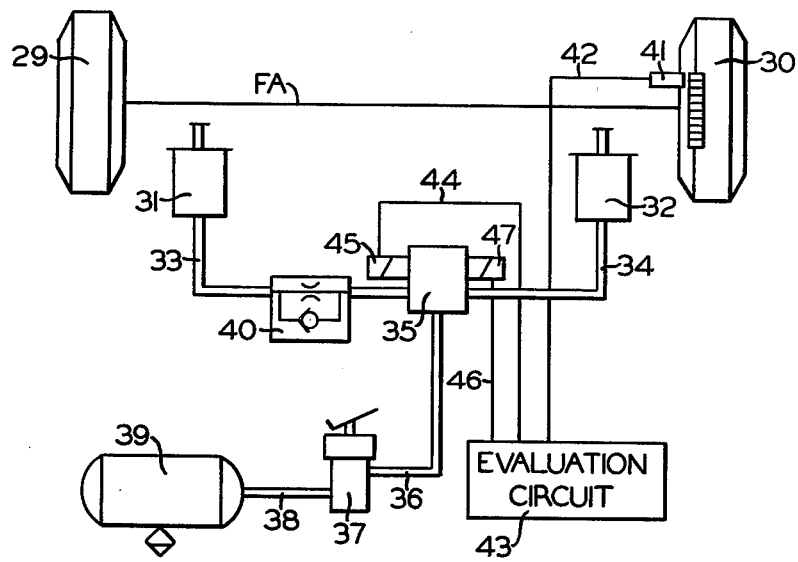
FIG. 4 shows a schematic diagram for a vehicle antiskid brake control system having a fluid pressure control means in the brake cylinder line of the non-sensed wheel of an axle to delay the buildup of brake pressure thereat.

In the embodiment of FIG. 4, there is shown an arrangement of an antiskid brake control system as applied to an axle of a vehicle whose other axle may be similarly arranged. In this embodiment, stability of the non-sensed wheel is assured by restricting the supply of fluid pressure to the non-sensed wheel brake cylinder, while releasing this pressure unrestricted.

Provided on front axle FA are wheels 29, 30 having associated therewith a respective brake cylinder 31, 32 to which supply pipes 33, 34 are connected from a single modulator valve assembly 35. A pipe 36 carries fluid pressure to and from the brake cylinders via modulator valve assembly 35 in accordance with operation of a foot operated brake valve device 37 to which a pipe 38 carries fluid pressure from a storage tank 39. Interposed in control line 33 is a flow control device 40 serves to restrict the rate of fluid pressure supplied to the non-sensed wheel brake cylinder 31, while permitting unrestricted release of fluid pressure therefrom.

The sensed wheel 30 has a sensor 41 whose output signals are connected via line 42 to evaluation circuit 43. A control line 44 leads from evaluation circuit 43 to the solenoid operated supply valve 45 of modulator valve assembly 35, while a control line 46 leads to solenoid operated exhaust valve 47.

By reason of the flow restriction of flow control device 40, fluid pressure supplied to brake cylinder 33 of the nonsensed wheel 29 builds up with a flatter pressure gradient than the pressure supplied to the sensed wheel brake cylinder 30. Consequently, the sensed wheel is inclined to show a skid tendency ahead of the non-sensed wheel, which is therefore stabilized against undetectable wheel skid.

Figure 5:
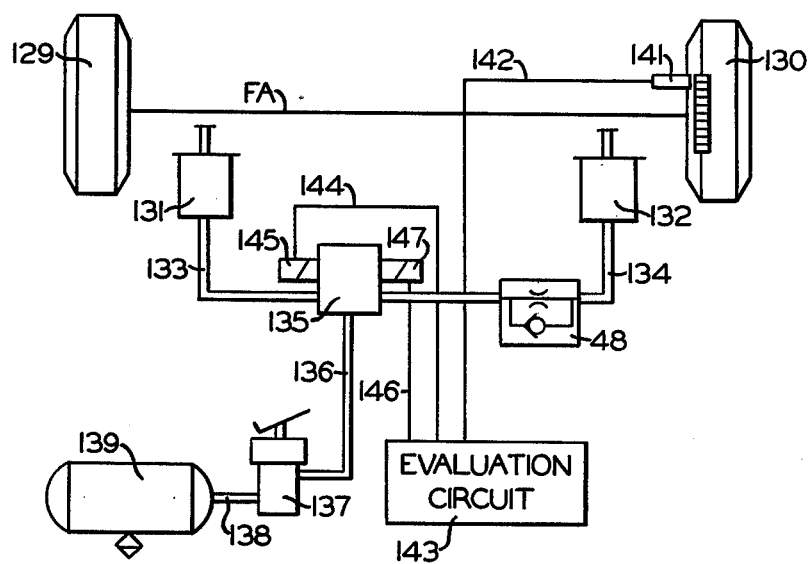
FIG. 5 shows a schematic diagram of a vehicle antiskid brake control system having a fluid pressure control means in the brake cylinder line of the sensed wheel of an axle to delay the exhaust of fluid brake pressure therefrom.

It is also possible, as shown in the embodiment of FIG. 5, to prevent the non-sensed wheel from becoming unstable by reducing the rate of flow of fluid pressure from the sensed wheel brake cylinder to atmosphere, while providing unrestricted supply of fluid pressure thereto. In this case, the sensed wheel brake cylinder pressure exhaust exhibits a flatter pressure gradient than does the non-sensed wheel brake pressure.

The reference numerals of FIG. 5 identifying like parts found in FIG. 4 are the same, but increased by a value of one hundred. A flow control device 48 is located in line 134 leading from modulator valve assembly 135 to the sensed wheel brake cylinder 132. Flow control device 48 comprises a flow restrictor and a one-way check valve in parallel with the flow restrictor, which makes it possible to release fluid pressure from cylinder 132 at a restricted rate so that the sensed wheel brake pressure remains higher than the non-sensed wheel brake pressure. Consequently, a subsequent reapplication of brake pressure during a cycle of wheel skid control will result in the sensed wheel brake pressure building back up to a level sufficient to produce a wheel skid prior to the non-sensed wheel, thereby assuring the stability of the non-sensed wheel.

Although flow control devices 40, 48 in FIGS. 4, 5 are represented as a parallel related flow restrictor and one-way check valve, it will be apparent that other functionally similar flow control devices may be employed, such as electro-pneumatic restrictor valves which may be electrically switched to establish a fluid flow path via either a restricted channel or an unrestricted channel and in this sense may be controlled by utilizing the evaluation circuit output signals 44, 46 or 144, 146.

In another arrangement of the invention, it is possible to sense the brake cylinder pressure at the wheels of a common axle, or at the diagonally opposed wheels on the same side of separate axles in order to deactuate the delay element associated with a skidding wheel axle prior to expiration of its normal delay period when a predetermined pressure differential is exceeded, in order to obtain maximum braking power on the sensed wheels in accordance with the available wheel/road adhesion and to avoid excessive reduction of braking power at the non-sensed wheel of the axle whose wheels have the lower adhesion.

Figure 6:
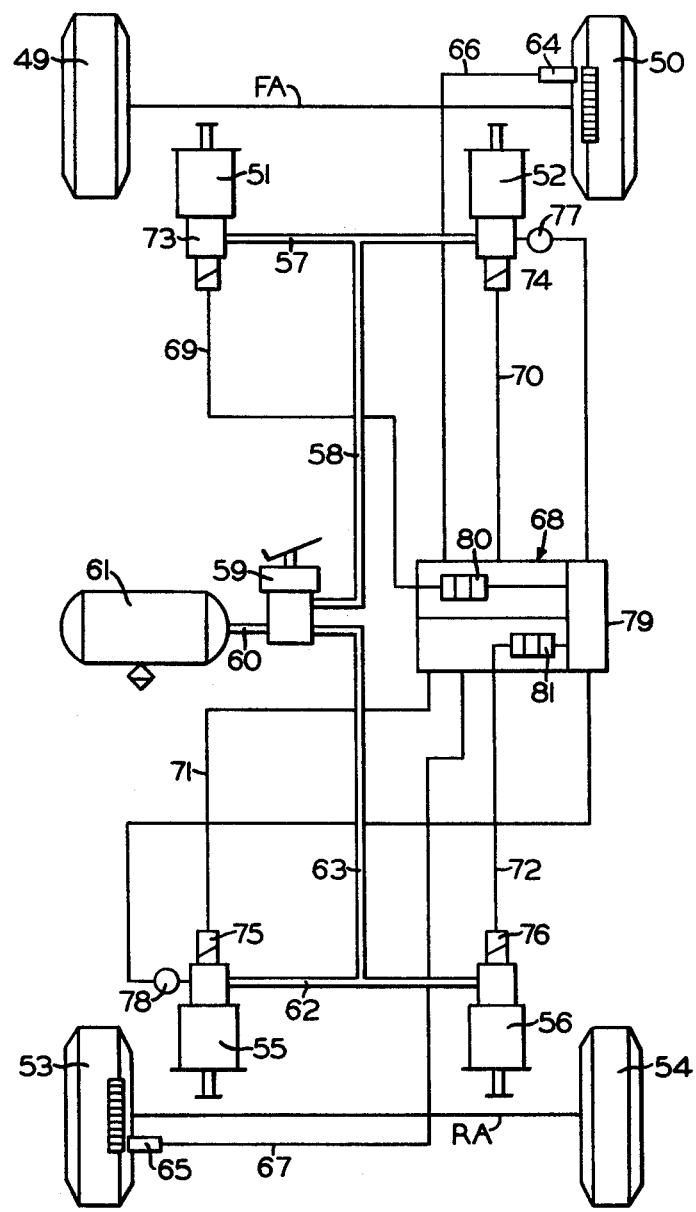
FIG. 6 shows a schematic diagram for a vehicle antiskid brake control system in which a wheel behavior evaluation circuit is arranged to detect a predetermined difference between the brake pressure at the sensed wheels of different axles in order to extend or cut off the duration the respective non-sensed wheel brake pressure is exhausted or supplied in order to assure at least minimum braking power on the axle whose wheels encounter the lower friction value.

An embodiment of the invention illustrating this feature is shown in FIG. 6 wherein wheels 49, 50 of front axle FA are provided with brake cylinders 51, 52 and wheels 53, 54 of rear axle RA are provided with brake cylinders 55, 56. Pipes 57 and 58 connect brake cylinders 51, 52 with an operator's brake valve device 59 to which a pipe 60 connects fluid from a storage tank 61. Likewise, pipes 62, 63 connect brake cylinders 55, 56 with brake valve device 59. The right wheel 50 of front axle FA and the left wheel 53 of rear axle RA are provided with sensors 64, 65, which are in turn connected via lines 66, 67 to evaluation circuit 68. Leading from evaluation circuit 68 are lines 69, 70, 71 and 72 for connection with a respective modulator valve assembly 73, 74, 75 and 76 associated with brake cylinders 51, 52, 53 and 54. The diagonally opposed wheels brake cylinders 52, 55 are provided with pressure transducers 77, 78 whose electrical signals are connected to a comparator 79 of evaluation circuit 68. The comparator outputs are connected via delay elements 80, 81 in lines 69, 72 for controlling a solenoid operated supply and/or exhaust valve (only one shown) comprising modulator valve assemblies 73, 76 of non-sensed wheels 49, 54.

In the event different brake pressure occurs at wheels 49, 54 during a brake application in excess of a predetermined amount due, for example, to the sensed wheel of one axle encountering a road surface providing such poor adhesion as to induce a wheel skid control cycle of the antiskid brake control system, comparator 79 will apply a control signal to delay element 80 or 81. The effect of this signal is to either disable and thus shorten the duration the delay element 80 or 81 is controlling the modulator valve assembly of the axle whose sensed wheel has encountered a low friction road surface or alternatively to prolong the period of operation of delay element 80 or 81 to increase the time of operation of the modulator valve assembly of the axle whose sensed wheel has encountered a high friction roadway.

If it is assumed, therefore, that the solenoid operated valve devices of modulator valves 73, 74, 75 and 76 constitute exhaust valves, which reduce braking pressure when operated responsive to an output signal via lines 69, 70, 71 and 72 of evaluation circuit 68, then during a wheel slip condition of the sensed wheel 50 of front axle FA, delay element 80 will prolong the resulting operation of modulator valve 73 relative to modulator valve 74 in accordance with the discussion in regard to FIG. 2. If it occurs, however, during subsequent cycles of wheel skid control that a pressure differential should develop between brake cylinders 52 and 55 in excess of a predetermined amount, as detected by transducers 77, 78 and comparator 79, due to the wheels of the rear axle RA exhibiting a better adhesion characteristic so as to require fewer cycles of antiskid control to assure wheel stability, comparator 79 will produce an output signal to nullify operation of delay element 80 and thereby prevent excessive depletion of pressure in brake cylinder 51, which would otherwise occur as a result of continued antiskid control operation affecting the front axle brake cylinders.

Having now described the invention, what we claim as new and desire to secure by Letters Patent, is:

1. An antiskid brake control system for the fluid pressure operated brakes of a vehicle having at least a pair of axles with a wheel at each end thereof, said system comprising:
 (a) a storage tank normally charged with fluid pressure;
 (b) a brake cylinder device for each wheel of the vehicle;
 (c) a fluid pressure conduit extending from said tank to each said brake cylinder device;
 (d) a brake valve device in said conduit for controlling the supply of fluid pressure from said tank to said brake cylinders and for controlling the release of said brake cylinder fluid pressure;
 (e) sensor means for providing output signals in accordance with the dynamic behavior of but a single wheel of at least one axle;
 (f) evaluation means for providing control signals in accordance with said output signals from said sensor means;
 (g) control valve means for modulating the fluid pressure of each said brake cylinder device in response to said control signals in order to adjust the brake cylinder pressure at the respective wheels independently of said brake valve device;
wherein the improvement comprises, (h) delay means for varying the degree of fluid pressure adjustment by said control valve means at said brake cylinder device of one of said wheels of an axle relative to the other of said wheels of the same axle, such as to preclude the fluid pressure at the brake cylinder of a wheel without said sensor means from attaining a level corresponding to the fluid pressure level at the brake cylinder of a wheel having said sensor means.

2. An antiskid brake control system as recited in claim 1, further characterized in that said delay means inhibits the buildup of fluid pressure at said brake cylinder device of the wheel without said sensor means relative to that of the wheel having said sensor means.

3. An antiskid brake control system as recited in claim 2, further characterized in that said modulator valve means includes a solenoid operated supply valve in said conduit between said brake valve and said brake cylinder device of the wheel without said sensor means, said solenoid operated supply valve having a control wire subject to one of said control signals provided by said evaluation means, said control wire having therein said delay means.

4. An antiskid brake control system as recited in claim 2, further characterized in that said delay means is disposed in said fluid pressure conduit between said control valve means and said brake cylinder device of the wheel without said sensor means.

5. An antiskid brake control system as recited in claim 3, further characterized in that said delay means comprises an electrical device exhibiting a "delay on drop out" characteristic so as to provide an output signal for a predetermined duration following loss of said one of said control signals.

6. An antiskid brake control system as recited in claim 4, further characterized in that said delay means comprises a fluid pressure restriction.

7. An antiskid brake control system as recited in claim 1, further characterized in that said delay means extends the duration of fluid pressure reduction at said brake cylinder device of the wheel without said sensor means relative to that of the wheel having said sensor means.

8. An antiskid brake control system as recited in claim 7, further characterized in that said control valve means includes an exhaust valve in said conduit between said brake valve device and said brake cylinder device of the wheel without said sensor means said solenoid operated exhaust valve having a first control wire subject to one of said control signals provided by said evaluation means, said control wire having therein said delay means.

9. An antiskid brake control system as recited in claim 8, further characterized in that said delay means comprises an electrical device exhibiting a "delay on drop out" characteristic so as to provide an output signal for a predetermined duration following loss of said one of said control signals.

10. An antiskid brake control system as recited in claim 9, further comprising:
(a) said delay means further including supply valve means in said branch conduit between said brake valve device and said brake cylinder device of the wheel without said sensor means, said supply valve means being operated by a solenoid subject to another one of said control signals provided by said evaluation means via a second control wire extending therebetween; and (b) an OR gate having its output and one input connected in said second control wire and its other input connected to the output of said electrical device to prevent said supply valve means from effecting delivery of fluid pressure to said brake cylinder device of the wheel without said sensor means until the exhaust of fluid brake pressure therefrom is terminated in response to disappearance of said one of said control signals.

11. An antiskid brake control system as recited in claim 1, further characterized in that said delay means retards the depressurization of said brake cylinder device of the wheel having said sensor means.

12. An antiskid brake control system as recited in claim 11, further characterized in that said control valve means includes a solenoid operated exhaust valve in said conduit between said brake valve device and said brake cylinder of the wheel having said sensor means said solenoid operated exhaust valve having a control wire energized responsive to one of said control signals provided by said evaluation means, said control wire having therein said delay means.

13. An antiskid brake control system as recited in claim 12, further characterized in that said delay means comprises an electrical device exhibiting a "delay on pull in"0 characteristic so as to delay energization of said control wire for a predetermined time after said one of said control signals is provided by said evaluation means.

14. An antiskid brake control system as recited in claim 11, further characterized in that said delay means is disposed in said conduit between said control valve means and said brake cylinder device of the wheel having said sensor means.

15. An antiskid brake control system as recited in claim 14, further characterized in that said delay means comprises a fluid pressure restrictor.

16. An antiskid brake control system as recited in claim 1, wherein said control valve means is provided for each wheel of each axle and said delay means is associated with said control valve means of the wheel without said sensor means at each axle, said system further comprising:
(a) transducer means at each axle for sensing the fluid pressure effective at the brake cylinder device of the wheel without said sensing means; and
(b) comparison means subject to said transducer means for disabling said delay means associated with the brake cylinder device of the wheel without said sensor means of whichever one of said axles said brake cylinder fluid pressure is sensed as being lower than the brake cylinder pressure on the other of said axles.

17. An antiskid brake control system as recited in claim 16, further characterized in that said delay means is disabled when the differential pressure between said brake cylinder devices of the respective axles exceeds a predetermined value.

18. An antiskid brake control system as recited in claim 1, wherein said control valve means is provided for each wheel of each axle, said sensor means is provided for but a single wheel of each axle and said delay means is associated with said modulator valve means of the wheel brake cylinder device without said sensor means at each axle, said system further comprising:
(a) transducer means for sensing the fluid pressure effective at the sensed wheel brake cylinder device of each axle; and (b) comparison means subject to said transducer means for prolonging the delay period provided by said delay means associated with the brake cylinder device of the wheel without said sensor means of whichever one of said axles said brake cylinder fluid pressure is detected as being greater than the brake cylinder pressure on the other of said axles.

19. An antiskid brake control system as recited in claim 18, further characterized in that the delay period provided by said delay means is prolonged when the differential pressure between said brake cylinder devices of the respective axles exceeds a predetermined value.

* * * * *